(12) United States Patent
Gyllenskog

(10) Patent No.: US 12,717,518 B2
(45) Date of Patent: Aug. 25, 2026

(54) QUEUE CONFIGURATION FOR HOST INTERFACE

(71) Applicant: Micron Technology, Inc., Boise, ID (US)

(72) Inventor: Christian M. Gyllenskog, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/524,470

(22) Filed: Nov. 11, 2021

(65) Prior Publication Data

US 2022/0171572 A1 Jun. 2, 2022

Related U.S. Application Data

(60) Provisional application No. 63/120,028, filed on Dec. 1, 2020.

(51) Int. Cl.
*G06F 3/06* (2006.01)
*G06F 7/78* (2006.01)

(52) U.S. Cl.
CPC .......... *G06F 3/0659* (2013.01); *G06F 3/0613* (2013.01); *G06F 3/067* (2013.01); *G06F 3/0673* (2013.01); *G06F 7/78* (2013.01)

(58) Field of Classification Search
CPC .... G06F 3/0659; G06F 3/0613; G06F 3/0673; G06F 7/78
See application file for complete search history.

(56) References Cited

U.S. PATENT DOCUMENTS 5,922,057 A * 7/1999 Holt ...................... G06F 15/167 710/52
8,156,415 B1 4/2012 Nguyen et al.
(Continued)

FOREIGN PATENT DOCUMENTS

CN 107229581 A 10/2017
CN 110221992 A 9/2019
(Continued)

OTHER PUBLICATIONS

JDEC standard for UFS Host Controller Interface (Year: 2012).*
(Continued)

*Primary Examiner* — Janice M. Girouard
(74) *Attorney, Agent, or Firm* — Holland & Hart LLP

(57) ABSTRACT

Methods, systems, and devices for queue configuration for host interface are described. An apparatus may include a host system including a first circular queue having a first entry that indicates a first command for a memory system and a location of data associated with the first command. The apparatus may include a controller that may access the first entry of the first circular queue and generate a second command for the memory system based on the data associated with the first command and the first entry. The controller may then transmit the second command to the memory system based on generating the command. The controller may also receive a response from the memory system based on transmitting the command. The controller may remove the first entry from the first circular queue based on receiving the response from the memory system.

24 Claims, 5 Drawing Sheets

(56) References Cited

U.S. PATENT DOCUMENTS

| | | | | |
|---|---|---|---|---|
| 10,324,622 | B2 | 6/2019 | Jung et al. | |
| 10,404,674 | B1 * | 9/2019 | Bshara | H04L 9/0894 |
| 10,642,536 | B2 * | 5/2020 | Chaturvedi | G06F 3/0605 |
| 10,817,446 | B1 * | 10/2020 | Saxena | G06F 13/1673 |
| 2013/0185517 | A1 * | 7/2013 | Elboim | G06F 12/0862 711/137 |
| 2015/0186074 | A1 * | 7/2015 | Benisty | G06F 3/061 711/170 |
| 2017/0083252 | A1 * | 3/2017 | Singh | G06F 3/0604 |
| 2017/0277434 | A1 | 9/2017 | Jung et al. | |
| 2017/0286205 | A1 | 10/2017 | Jeong et al. | |
| 2019/0272217 | A1 | 9/2019 | Lee et al. | |
| 2019/0278514 | A1 * | 9/2019 | Chaturvedi | G11C 29/44 |
| 2019/0294344 | A1 * | 9/2019 | Hahn | G06F 3/0614 |
| 2019/0294373 | A1 | 9/2019 | Lee et al. | |
| 2019/0317909 | A1 * | 10/2019 | Gupta | G06F 13/1668 |
| 2019/0332276 | A1 * | 10/2019 | Gupta | G06F 3/0655 |
| 2019/0369913 | A1 * | 12/2019 | Hahn | G06F 3/0619 |
| 2020/0310682 | A1 | 10/2020 | Benisty | |
| 2022/0138059 | A1 * | 5/2022 | Lee | G06F 11/0772 714/4.5 |
| 2022/0147392 | A1 * | 5/2022 | Choi | G06F 9/5016 |

FOREIGN PATENT DOCUMENTS

| | | | |
|---|---|---|---|
| CN | 110365604 | A | 10/2019 |
| CN | 111164566 | A | 5/2020 |
| KR | 10-2022-0060909 | A | 5/2022 |

OTHER PUBLICATIONS

"International Search Report and Written Opinion of the International Searching Authority," issued in connection with Int'l Appl. No. PCT/US21/72596, dated Mar. 17, 2022, (8 pages).

Chinese patent office, "China Office Action," issued in connection with China Patent Application No. 202180080646.3 dated Apr. 4, 2024 (14 pages) (6 pages of English Translation and 8 pages of Original Document).

Chinese patent office, "China Office Action," issued in connection with China Patent Application No. 202180080646.3 dated Dec. 5, 2024 (10 pages) (4 pages of English Translation and 6 pages of Original Document).

* cited by examiner

200

400

QUEUE CONFIGURATION FOR HOST INTERFACE

CROSS REFERENCE

The present Application for Patent claims the benefit of U.S. Provisional Patent Application No. 63/120,028 by GYLLENSKOG, entitled "QUEUE CONFIGURATION FOR HOST INTERFACE," filed Dec. 1, 2020, which is assigned to the assignee hereof, and which is expressly incorporated by reference herein.

FIELD OF TECHNOLOGY

The following relates generally to one or more systems for memory and more specifically to queue configuration for host interface.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not- or (NOR), and not- and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A host system may communicate commands to a memory system coupled with the host system to perform a variety of operations, applications, and processing tasks. Some host systems may implement a register that a host software utilizes to indicate commands for a host controller to communicate with the memory system. For example, the host system may use a register into which the processing cores of the host system may enter commands. The host controller may then read a command from the register, package the command, and transmit the command to the memory system. In such examples, the quantity of commands the host controller can communicate may be limited by the quantity of entries capable of being stored in the register—e.g., 32 commands for some registers. Additionally or alternatively, in such examples the cores of the host system may be unable to concurrently enter commands to the register. That is, if the host system has two (2) cores, a first core may enter a command while a second core will wait. When the first core is done entering the command then the second core may enter a second command. Accordingly, the host system processing times may be slowed down by a bottleneck to processing around the register—e.g., as the second core waits, the host system may experience delays which slows the overall performance of the host system.

Systems, devices, and techniques are described for a host system utilizing multiple circular queues to communicate commands and responses with a memory system coupled with the host system. For example, a host system may configure multiple queues across multiple cores of the host system dynamically—e.g., the host system may utilize one or more circular queues in a first core and one or more circular queues in a second core based on various parameters. Such a configuration may allow each core of the host system to concurrently enter commands into a respective queue—e.g., the first core may enter a first command in a first queue and a second core may enter a second command in a second queue concurrently. Additionally, the host system may utilize a first set of circular queues to track commands to transmit to the memory system and a second set of circular queues to track responses from the memory system. By utilizing the multiple circular queues, the host system may increase the quantity of commands it may concurrently transmit to a memory system at a given time and may thereby reduce processing times.

Features of the disclosure are initially described in the context of systems, devices, and circuits as described with reference to FIG. 1. Features of the disclosure are described in the context of host systems and process flow diagram as described with reference to FIGS. 2 and 3. These and other features of the disclosure are further illustrated by and described with reference to an apparatus diagram and a flowchart that relate to queue configuration for host interface as described with reference to FIGS. 4 and 5.

Figure 1:
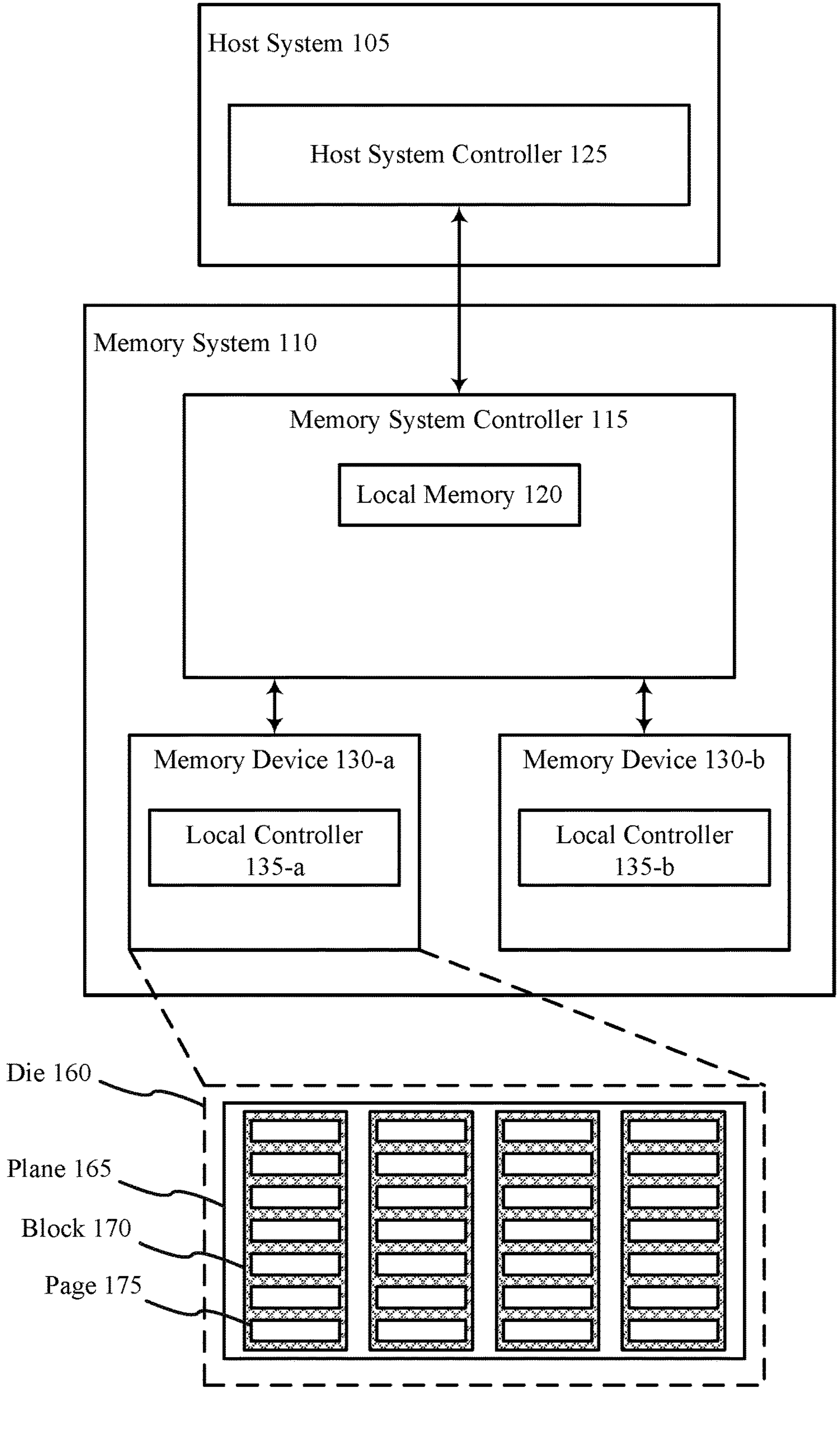
FIG. 1 illustrates an example of a system that supports queue configuration for host interface in accordance with examples as disclosed herein.

FIG. 1 is an example of a system 100 that supports queue configuration for host interface in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 125, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, the host system 105 may be coupled with any quantity of memory systems 110.

In some examples, the host system 105 may include a host system controller 125 (e.g., a host-controller interface). The host system controller 125 may be configured to communicate between the host system 105 and the memory system 110. For example, the host system controller 125 may transmit commands to the memory system 110 and receive responses from the memory system 110. In such examples, the host system controller 125 may receive a first command from the host system 105 software and translate or convert the first command into a second command that is transmitted to the memory system 110. Similarly, the host system controller 125 may receive responses from the memory system 110 and translate or convert the response into a message readable by the host system 105 software.

In some examples, the host system controller 125 may receive commands from the host system 105 software through a register—e.g., a 32-entry register or a 32-bit register. In such examples, the host system controller 125 may read the register for the command, access data associated with the command, generate a second command for the memory system 110, and then transmit the second command to the memory system 110. In such examples, the host system controller 125 may be limited in a quantity of commands the host system controller 125 can concurrently transmit to the memory system 110—e.g., the host system controller 125 may be unable to transmit more than commands concurrently than a quantity of bits in the register. Additionally, cores of the host system 105 may be unable to concurrently enter a command to the register—e.g., if a first core of the host system 105 is entering a command into the register for the host system controller 125 to read, a second core of the host system 105 may be unable to enter a second command until the first core is done.

This may limit when some procedures may be completed and may thus increase the processing times of the host system 105, in some cases.

As described herein, the host system controller 125 may receive commands from the host system 105 software through multiple circular queues. The multiple circular queues may be dynamically configurable by the host system 105 software—e.g., the host system 105 software may configure two (2) circular queues for the first core and three (3) circular queues for the second core. Utilizing multiple circular queues may enable the core of the host system 105 to concurrently enter commands into their respective queues. The host system controller 125 may also write a response from the memory system into a different set of multiple circular queues. That is, the host system 105 software may also be able to concurrently process multiple responses from the memory system 110 across their respective circular queues. This may enable the host system 105 to increase processing times and increase the quantity of commands the host system controller 125 may concurrently transmit to the memory system 110.

The host system 105 may be coupled with the memory system 110 via at least one physical host interface (e.g., the host-controller interface). The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between the host system controller 125 of the host system 105 and a memory system controller 115 of the memory system 110. In some examples, the host system 105 may be coupled with the memory system 110 (e.g., the host system controller 125 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 when read from or written to a memory device 130, and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

Figure 2:
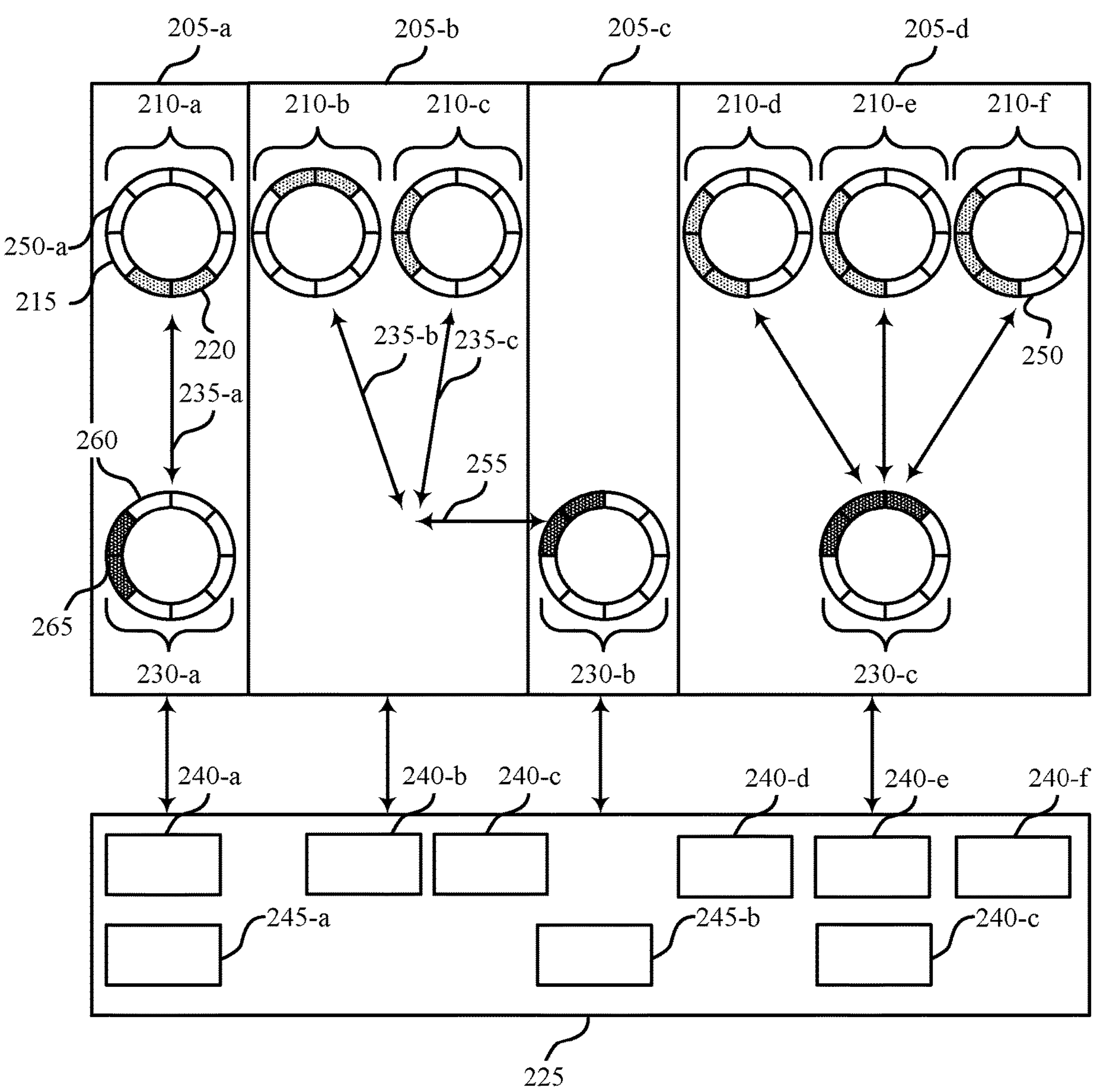
FIG. 2 illustrates an example of a host system that supports queue configuration for host interface in accordance with examples as disclosed herein.

FIG. 2 illustrates an example of a of a host system 200 that supports queue configuration for host interface in accordance with examples as disclosed herein. Host system 200 may be an example of host system 105 as described with reference to FIG. 1. The host system 200 may include four (4) cores 205-*a* through 205-*d*. The four cores 205 are shown in FIG. 2 for illustrative purposes only. In other examples, the host system 200 may include any quantity of cores 205 including one, two, three, four, five, six, seven, eight, nine, ten, eleven, twelve, thirteen, fourteen, fifteen, sixteen, seventeen or more cores 205. The host system 200 may also include a first set of circular queues 210—e.g., circular queue 210-*a* through circular queue 210-*f*. In some examples, the first set of circular queues 210 may be referred to as submission queues. The host system may include a second set of circular queues 230—e.g., circular queue 230-*a* through circular queue 230-*c*. In some examples, the second set of circular queues 230 may be referred to as completion queues. The cores 205 may be coupled with a host system controller 225. Host system controller 225 may be an example of host system controller 125 as described with reference to FIG. 1. In some examples, the host system controller 225 may also be referred to as a host interface. The host system controller 225 may include a first set of registers 240 (e.g., registers 240-*a* through 240-*f*) and a second set of registers 245 (e.g., registers 245-*a* through 240-*c*).

The host system 200 may be configured to dynamically configure a quantity of the first set of circular queues 210 and the second set of circular queues 230. That is, each core 205 may be configured to operate independently of each other—e.g., independently perform computational tasks for the host system 200. Accordingly, the host system 200 may utilize software to determine the quantity of the first set of circular queues 210 and the second set of circular queues 230. For example, host system 200 may configure the quantity of circular queues 210 in each core 205 based on a largest size of a command communicated between the host system 200 and the memory system. In other examples, the host system 200 may configure the quantity of circular queues 210 based on a quantity of entries 250 a circular queue 210 may store.

Additionally, the host system 200 may consider other parameters or factors when determining the quantity of circular queues 210, For example, the host system 200 may determine the fourth core 205-*d* handles a relatively high quantity of tasks and data migration and may therefore configure the fourth core 205-*d* to have three (3) circular queues 210. In some examples, the host system 200 may configure the second core 205-*b* for processing commands and configure the third core 205-*c* for processing responses from a memory system (e.g., memory system 110 as described with reference to FIG. 1). In such examples, the host system 200 may configure the second core 205-*b* to include two (2) circular queues 210 and the third core 205-*c* to include one (1) circular queue 230. In some examples, each core 205 may be configured to also dynamically configure the quantity of the first set of circular queues 210 and the second set of circular queues 230. That is, the third core 205-*c* may determine it is receiving more responses and may accordingly configure a circular queue 230-*b*. In some examples, the quantity of circular queues 210 may be limited by a quantity of commands the memory system may perform concurrently—e.g., the host system 200 may refrain from having a quantity of circular queues 210 that exceeds the quantity of commands the memory system may receive at a given time. In some examples, the host system 200 may determine the quantity of commands the memory system may receive by transmitting an initial request for the information. In other examples, the quantity of commands the memory system may receive may be based on an industry standard. Additionally, the cores 205 may be configured to communicate internally (intra core messaging) through routing lines 235 (e.g. 235-*a*). In other examples, the cores 205 may be configured to communicate with other cores (inter core messaging) through routing lines 255.

The first set of circular queues 210 may be configured to transfer commands and messages between the host system 200 and the memory system. For example, the circular queues 210 may store commands issued by the cores 205 and the host system 200. That is, the cores 205 may enter commands into the circular queues 210 as an entry 250. The circular queues 210 may store a plurality of entries 250 and serve as a queue for commands and messages to transmit from the host system 200 to the memory system—e.g., the shaded portions in the circular queues 210 may be an example of the quantity of entries 250 and commands the circular queues 210 are storing. The quantity of entries 250 a circular queue 210 may have may be based on the processing power of the host system 200 and the cores 205 and other circular queues 210 in the cores. Although each circular queue 210 is shown with eight (8) entries 250, in other examples the circular queue 210 may have more than or less than eight (8) entries 250. The cores 205 may configure the size of each entry 250 based on a size of a largest command or message that is communicated from the host system 200 to the memory system. Each circular queue 210 may operate independently of another circular queue 210. For example, circular queue 210-*a* may operate independently from circular queue 210-*b* and circular queue 210-*d*. In such examples, each core 205 may perform tasks concurrently (or in parallel) with another core 205. For example, the first core 205-*a* may enter a command into the circular queue 210-*a* while core 205-*d* is concurrently entering a command into the circular queue 210-*d*. Accordingly, the host system 200 may perform multiple tasks concurrently and increase the overall processing speed of the host system 200.

Additionally, each circular queue 210 may have a head pointer 215 and a tail pointer 220 (e.g., doorbells). The head pointer 215 may be configured to indicate an entry 250 in the circular queue 210-*a* that is available to store a command or message. In some examples, the head pointer 215 may be configured to increment from a first entry 250 to a second entry 250 when a command is stored at the first entry 250. For example, the head pointer 215 may increment to entry 250-*a* when the entry the head pointer 215 is indicating is written to by the first core 205-*a*. The tail pointer 220 may be configured to indicate an entry 250 in the circular queue 210-*a* that is available to be removed (e.g., erased). In some examples, the tail pointer 220 may increment from a first entry 250 to a second entry 250 when a command stored at the first entry 250 is executed (e.g., consumed). For example, the tail pointer 220 may shift to the left after the current entry 250 the tail pointer 220 is pointing to is removed. The core 205-*a* may determine the circular queue 210-*a* is empty (e.g., devoid of an entry) when the head pointer 215 is in the same location as the tail pointer 220. When the head pointer 215 exceeds the quantity of entries 250, the head pointer 215 may point back to the start of a location of the circular queue 210-*a*—e.g., a wrap condition may occur when the head pointer 215 exceeds the quantity of entries 250 and may then reset and indicate a first entry 250 (e.g., a start) of the circular queue 210-*a*. In some examples, the circular queues 210 are first in first out circular queues. For example, a first entry 250 written in the circular queue 210-*a* may be the first entry accessed by the host system controller 225, a second entry 250 written in the circular queue 210-*a* may be the second entry accessed by host system controller 225, and so forth.

The second set of circular queues 230 may be configured to act as a mechanism to receive responses and messages between the host system 200 and the memory system. For example, circular queues 230 may store responses received from the memory system. That is, the host system controller 225 may write a response from the memory system to the circular queue 230-*a* where the response is based on a command sent from the circular queue 210-*a*. The circular queues 230 may store a plurality of response—e.g., the shaded portions may represent stored responses. A size of each entry in the circular queues 230 may be based on a largest size of a response that may be received from the memory system. Each circular queue 230 may have more than or less than eight (8) queues—e.g., although each circular queue 230 is shown with eight (8) entries, in other examples the circular queues 230 may have more than or less than eight (8) entries. Circular queues 230 may also operate independently of each other—e.g., circular queue 230-*a* may receive a first response and circular queue 230-*b* may receive a second response concurrently. In some examples, a single circular queue 230 may receive responses associated with multiple circular queues 210. For example, the circular queue 230-*b* may receive a response associated with a command from the circular queue 210-*b* and a response associated with a command from the circular queue 210-*c*, even when the circular queue 230-*b* is in a different core.

Additionally, each circular queue 230 may have a head pointer 260 and a tail pointer 265. The head pointer 260 may indicate an entry in the circular queue 230-*a* that is available to write a response to. In some examples, the head pointer 260 may increment from a first entry to a second entry based on a response being written to the first entry and the second entry being available to write a second response. The tail pointer 265 may indicate an entry in circular queue 230-*a* that may be removed. In such examples, the core 205-*a* may remove the entry to process the response from the memory system—e.g., determine the memory system has properly executed the command associated with the response). The tail pointer 265 may increment from a first entry to a second entry that is to be removed based on the first entry being removed from the circular queue 230-*a*. In some examples, the circular queues 230 are first in first out circular queues. For example, a first entry 250 written in the circular queue 230-*a* may be a first command received from a memory system, a second entry 250 written in the circular queue 230-*a* may be the second command sent to the memory system, and so forth.

The host system controller 225 (e.g., host-controller interface) may be configured to communicate commands and responses between the host system 200 and the memory system. For example, the host system controller 225 may be configured to read an entry from the first set of circular queues 210. The host system controller 225 may then package the command to be suitable to transmit to the memory system—e.g., the host system controller 225 may translate between the host system 200 software and the memory system. For example, the host system controller 225 may fetch the data indicated in the entry and generate a second command to transmit to the memory system that includes the information. With the host system controller 225 (e.g., as part of a host controller interface) having the capability to translate between commands from the host and commands for the memory system may allow the host system to work together even though they might use different command protocols. The host system controller 225 may be configured to communicate between the host system 200 software and the memory system coupled with the host system 200. The host system controller 225 may also be configured to receive responses from the memory system after the memory system executes the commands. In some examples, the host system controller 225 may be configured to write the response to the second set of circular queues 230.

The host system controller 225 may also include a first set of registers 240 and a second set of registers 245. In some example, each register 240 of the first set of registers 240 may correspond to a circular queue 210 of the first set of circular queues 210. For example, register 240-*a* may correspond to circular queue 210-*a*. In some examples, the register 240-*a* may recognize an entry 250 in the circular queue 210-*a* is available to be read from by the host system controller 225. In other examples, each register 245 of the second set of registers 245 may correspond to a circular queue 230 of the second set of circular queues 230. For example, register 245-*a* may correspond to circular queue 230-*a*. In some examples, register 245-*a* may recognize an entry in the circular queue 210-*a* is available to remove. That is, the host system controller 225 may utilize the first set of registers 240 to determine when to read from the first set of circular queues 210 and may utilize the second set of registers 245 to determine when to remove entries from the second set of circular queues 230.

Figure 3:
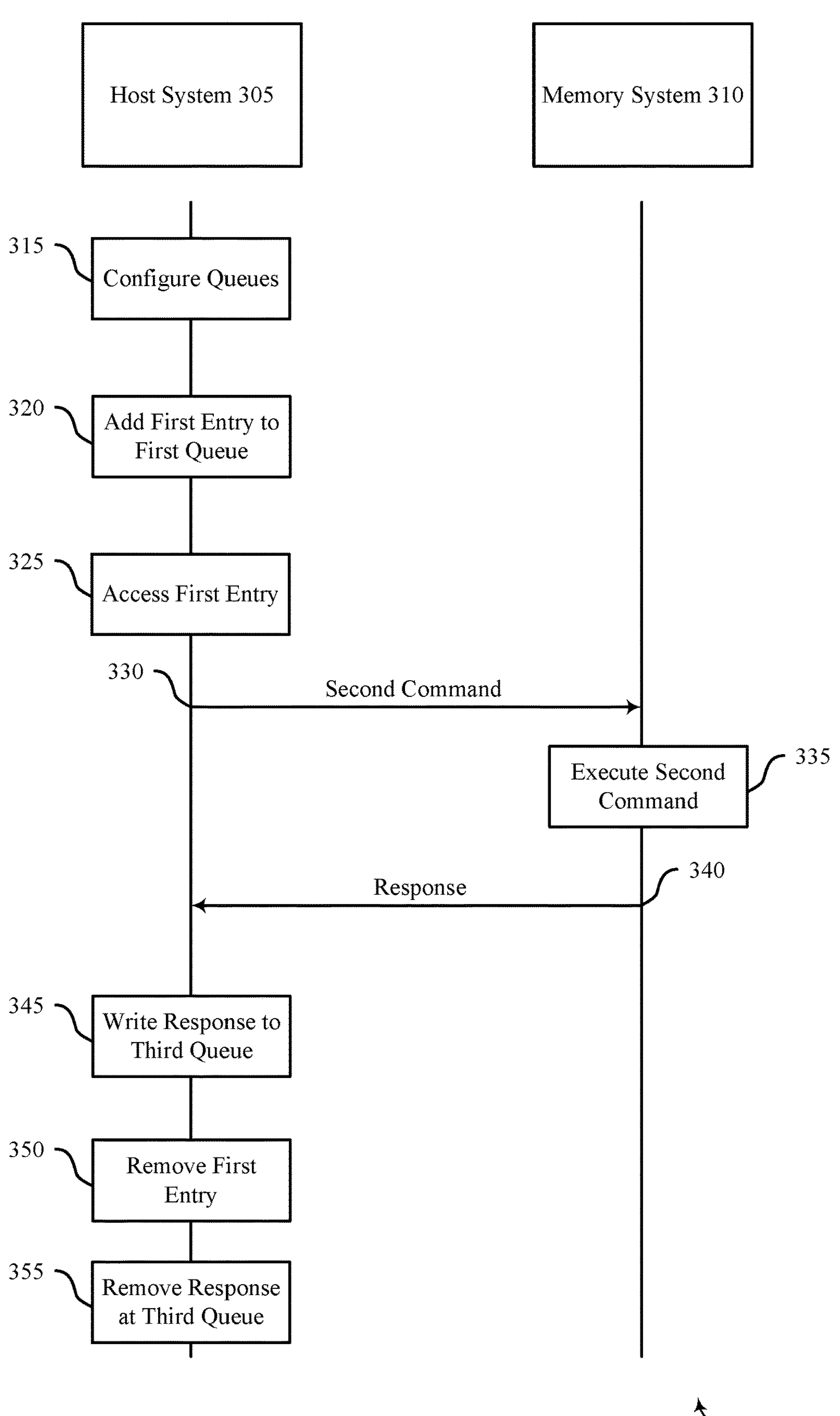
FIG. 3 illustrates an example of a process flow that supports queue configuration for host interface in accordance with examples as disclosed herein.

FIG. 3 illustrates an example of a process flow 300 that supports queue configuration for host interface in accordance with examples as disclosed herein. The process flow 300 may be performed by processing logic that may include hardware (e.g., processing system, circuitry, dedicated logic, programmable logic, microcode, hardware of a device, integrated circuit, etc.), software (e.g., instructions run or executed on a processing device), or a combination thereof. In some examples, the process flow 300 may be performed by system (e.g., system 100) as described with reference to FIG. 1. For example, the process flow 300 may be performed by a host system 305 (e.g., host system 105 as described with reference to FIG. 1) and a memory system 310 (e.g., memory system 110 as described with reference to FIG. 2). In some examples, a memory system 310 may execute a set of codes to control the functional elements of the memory system to perform the functions described below. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. FIG. 3 may illustrate the system 100 communicating commands and responses between the host system 305 and the memory system 310 utilizing multiple circular queues (e.g., the first set of circular queues 210 and the second set of circular queues 230).

At 315, circular queues may be configured. For example, the host system 305 may configure multiple circular queues across multiple cores (e.g., cores 205 as described with reference to FIG. 2). The circular queues may be configured by a host system controller (e.g., host system controller 225 as described with reference to FIG. 2). In some examples, the host system 305 may configure the circular queues dynamically. That is, the host system 305 may configure the circular queues based on the needs of the host system 305 or one of the multiple cores. In some examples, the host system 305 may configure the circular queues based on a quantity of entries (e.g., entries 250 as described with reference to FIG. 2) included in a single circular queue or based on a size of the entry. That is, the host system 305 may configure the circular queues based on a largest size a command or a response stored in the circular queues has. In some examples, the host system 305 may also configure the circular queues based on a quantity of commands the memory system 310 may receive concurrently.

At 320, a first entry may be added to a first circular queue. For example, the host system 305 adds the first entry at the first circular queue of the multiple circular queues. The first entry may be added by a core of the host system 305. In some examples, a host software of the host system 305 may determine a command to transmit to the memory system 310. In such examples, the host system 305 or core may add the command as the first entry of the first circular queue—e.g., write the command to the first entry. In some cases, the host system 305 may also add a first entry (e.g., store a command) at a second circular queue. That is, the host system 305 may store commands concurrently at the multiple circular queues, speeding up processing times. In some examples, the first circular queue may be in a first core and the second circular queue may be in a second core. In some examples, the command stored at the first entry may include a command pointer (command PTR), a response offset, a response size, a total size, an identification (ID) and an overall status. Additionally, the command may include a location of data associated with the command and a location to write a response to the command. That is, the command may indicate a PRDT—e.g., a scatter gather list of where the data is stored in the host system 305. In some examples, the command may indicate a data buffer in the host system 305 storing the data associated with the command.

The command may also indicate a response UFS protocol information unit (UPIU)—e.g., a location to store a response received from the memory system 310. The UPIU may also indicate the nature of the response—e.g., a type of response the host system 305 expects to receive from the memory system 310. In some examples, the host system 305 may store the command at the first entry based on a first indicator (e.g., head pointer 215 as described with reference to FIG. 2) indicating an entry available to store a command. Following the host system 305 storing the first command at the first entry, the indicator may be incremented to a second entry—e.g., the first indicator may then indicate the second entry is available to store a second command from the host system 305.

At 325, the first entry may be accessed. For example, the host system 305 may access the first entry of the first circular queue. The host system controller may access the first entry based on a register (e.g., the first set of registers 240) indicating the first entry is available to access. In some examples, the host system controller may access the first entry and generate a second command for the memory system 310. That is, the host system controller may translate the command stored at the first entry by the host system 305 software into a second command that is receivable by the memory system 310. For example, the host system controller may access data at the location indicated by the command stored at the first entry—e.g., data that the host system controller may utilize to generate the second command.

For example, the host system controller may access a first data buffer in the host system 305 to fetch the data associated with the command based on the data location. The host system controller may also record a location to store to a response from the memory system 310 after the memory system 310 executes the second command. After fetching the data and recording the location to store the response, the host system controller may package the command to generate the second command for the memory system 310.

At 330, a second command may be sent. For example, the host system 305 may transmit the second command to the memory system 310. In some examples, the second command is sent by the host system controller. In some examples, the host system controller may also transmit other commands (e.g., a third command) from the second circular queue to the memory system concurrent with the second command.

At 335, the second command may be executed. For example, the memory system 310 may execute the second command received from the memory system controller. In some examples, the second command may be a read, write, or refresh command (e.g., an access command). After executing the second command, the memory system 310 may generate a response to transmit to the host system 305.

At 340, a response may be received. For example, the host system 305 may receive the response from the memory system 310. In some examples, the response may be received at the host system controller.

At 345, a response may be written to a third circular queue. For example, the host system 305 may write a first entry to a third circular queue (e.g., a circular queue of the second set of circular queues 230). The host system controller may write the response to the third circular queue. In some examples, the host system 305 may include completion circular queues—e.g., queues keeping track of every response received from the memory system 310. The third circular queue may be an example of the completion circular queue. The host system controller may write information associated with the response to the first entry of the third queue after receiving the response from the memory system 310. In some examples, the host system controller may write the response to the first entry of the third circular queue based on a second indicator (e.g., head pointer 260 as described with reference to FIG. 2). The host system controller may increment the indicator to a second entry after writing to the first entry to indicate the second entry is available to store a second response from the memory system 310. In other examples, the host system controller may write the information to the first entry of the third circular queue based on the location indicated by the command (e.g., the response UPIU).

At 350, the first entry may be removed. For example, the host system 305 may remove the first entry from the first circular queue. In some examples, after the response is written to the third circular queue, the host system controller may remove the first entry (e.g., erase the first entry). That is, the host system controller may remove the first entry after the command in the first entry is executed by the memory system 310. In some examples, the host system controller may remove the first entry based on a second indicator (e.g., a tail pointer 220 as described with reference to FIG. 2). Upon removing the first entry, the host system controller may increment the second indicator to a second entry—e.g., the host system controller may indicate a second entry including a second command has been sent and is awaiting a response before being removed from the queue. In some examples, the host system controller may also determine the first queue is devoid of an entry (e.g., empty) based on the first indicator and second indicator both indicating a same location.

At 355, the response at the third circular queue may be removed. For example, the host system 305 may remove the response from the memory system 310 from the third circular queue. In some examples, the host system 305 or a core of the host system 305 may remove the response after processing the response from the memory system 310. That is, the host system 305 may fetch the information written to the third queue associated with the response, determine the memory system 310 properly executed the response, and remove the response from the third circular queue accordingly. In some examples, the host system 305 may remove the third queue based on a second indicator (e.g., tail pointer 265 as described with reference to FIG. 2) at the third circular queue. After removing the response, the host system 305 may increment the second indicator from the first entry storing the response to a second entry storing a second response. In some examples, the host system 305 may continue to utilize the process as described herein to communicate further commands and receive further responses. For example, the host system 305 may write a second command to the second entry of the first circular queue based on the first indicator indicating the second entry. The host system 305 may then increment the first indicator to a third entry at the first circular queue. The host system controller may access the second entry, package a third command stored in the second entry to generate a fourth command to transmit to the memory system 310. The host system controller may then receive a second response and store the second response at the second entry of the third circular queue based on the first indicator of the third circular queue. The host system controller may then increment the first indicator to a third entry of the third circular queue. The host system controller may then remove the second entry from the first circular queue and increment a second indicator the first circular queue to the third entry. The host system 305 may process the second response and remove the second response from the third circular queue and then increment the second indicator of the third circular queue to the third entry of third circular queue and so forth. In some examples, the host system may perform the process as described concurrently at a second core utilizing the second circular queue a fourth circular queue.

Figure 4:
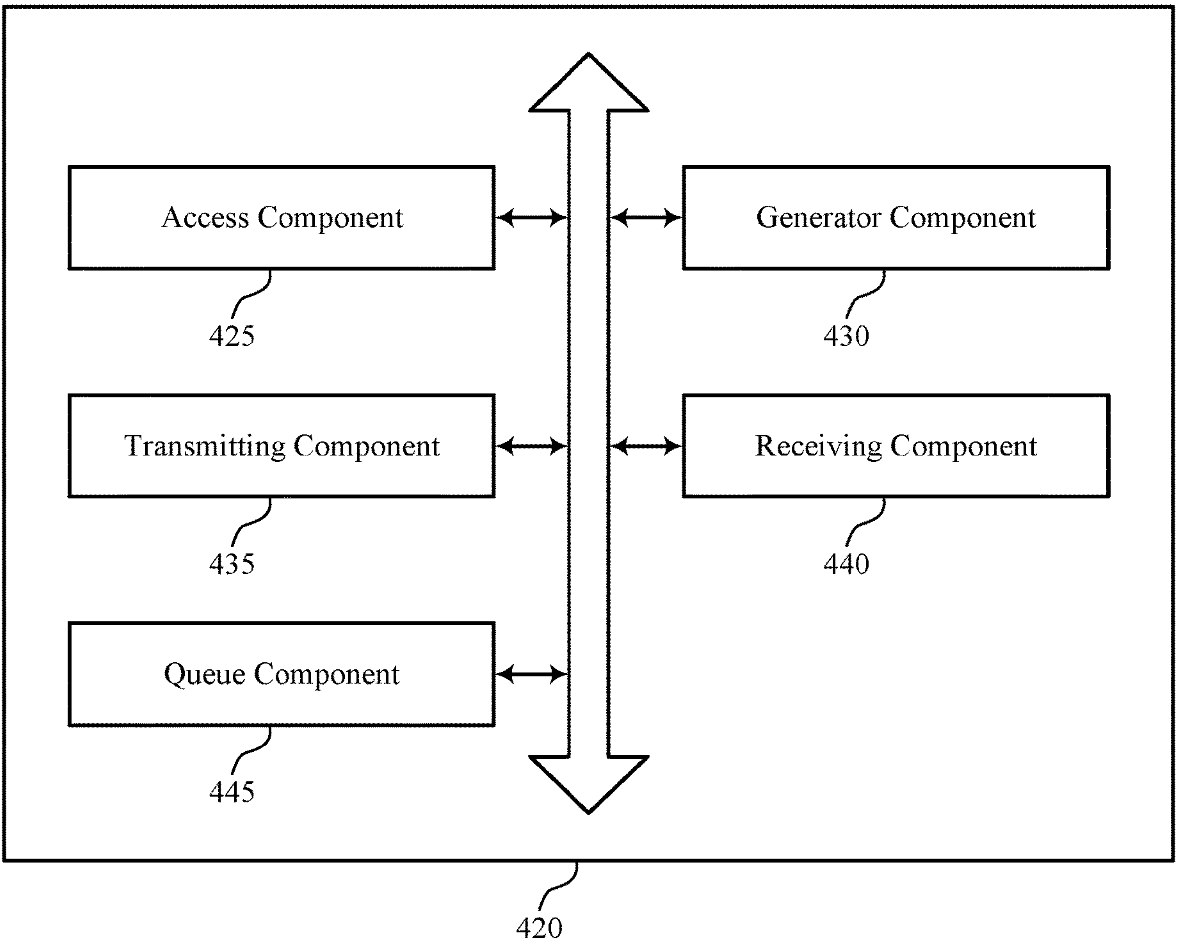
FIG. 4 shows a block diagram of a host system controller that supports queue configuration for host interface in accordance with examples as disclosed herein.

FIG. 4 shows a block diagram 400 of a host system controller 420 that supports queue configuration for host interface in accordance with examples as disclosed herein. The host system controller 420 may be an example of aspects of a host system controller as described with reference to FIGS. 1 through 3. The host system controller 420, or various components thereof, may be an example of means for performing various aspects of queue configuration for host interface as described herein. For example, the host system controller 420 may include an access component 425, a generator component 430, a transmitting component 435, a receiving component 440, a queue component 445, or any combination thereof. Each of these components may communicate, directly or indirectly, with one another (e.g., via one or more buses).

The access component 425 may be configured as or otherwise support a means for accessing, at a host system, a first entry of a first circular queue that indicates a first command for a memory system and a location of data associated with the first command. In some examples, the access component 425 may be configured as or otherwise support a means for accessing, at the host system, the first entry of the first circular queue to issue a third command based at least in part on the indicator incrementing from the first entry to the second entry. In some cases, the access component 425 may be configured as or otherwise support a means for accessing the location of the data associated with the first command, where generating the second command is based at least in part on accessing the location of the data associated with the first command.

The generator component 430 may be configured as or otherwise support a means for generating a second command for the memory system based at least in part on the data associated with the first command stored in the first circular queue and the first entry of the first circular queue.

The transmitting component 435 may be configured as or otherwise support a means for transmitting the second command to the memory system based at least in part on generating the second command.

The receiving component 440 may be configured as or otherwise support a means for receiving, from the memory system, a response indicating that the second command is complete based at least in part on transmitting the second command.

The queue component 445 may be configured as or otherwise support a means for removing the first entry from the first circular queue based at least in part on receiving the response from the memory system indicating the second command is complete.

In some examples, the queue component 445 may be configured as or otherwise support a means for writing information to a second entry of a second circular queue in the host system based at least in part on receiving the response from the memory system, where removing the first entry from the first circular queue is based at least in part on writing the second entry of the second circular queue. In some examples, queue component 445 may determine a second location to store the response based on the first circular queue indicating the second location to store the response from the memory system. In some cases, the queue component 445 may be configured as or otherwise support a means for incrementing an indicator from the first entry to a second entry in the first circular queue based at least in part on receiving the response from the memory system, the indicator configured to indicate an entry in the first circular queue to be removed by the host system, where removing the first entry from the first circular queue is based at least in part on incrementing the indicator.

In some instances, the queue component 445 may be configured as or otherwise support a means for identifying a second entry of the first circular queue to write the second command for the memory system based at least in part on an indicator associated with the first circular queue, the indicator configured to indicate an entry in the first circular queue configured to receive information from the host system. In some cases, the queue component 445 may be configured as or otherwise support a means for writing, at the host system, second data associated with the second command to the second entry of the first circular queue based at least in part on identifying the second entry using the indicator. In some examples, the queue component 445 may be configured as or otherwise support a means for incrementing the indicator from the second entry to a third entry of the first circular queue to indicate the third entry is available to write to by the host system based at least in part on writing the second data to the second entry.

In some examples, the queue component 445 may be configured as or otherwise support a means for configuring the first circular queue for a first processor based at least in part on a quantity parameter associated with entries of the first circular queue and an entry size parameter, where accessing the first circular queue is based at least in part on configuring the first circular queue. In some cases, the queue component 445 may be configured as or otherwise support a means for determining that the first circular queue is devoid of data based at least in part on a first indicator associated with the first circular queue pointing to a same location as a second indicator associated with the first circular queue, the first indicator configured to indicate an entry in the first circular queue is available to write to by the host system, and the second indicator is configured to indicate an entry in the first circular queue to be removed by the host system.

In some examples, the queue component 445 may configure the first circular queue is to store commands issued by a first processor core of the host system. In some cases, the queue component 445 may configure a second circular queue to store commands issued by a second processor core of the host system. In some examples, the queue component 445 may configure is configured to store a command in the second circular queue concurrently while the host system is configured to store the first command in the first circular queue. In some instances, the queue component 445 may configure the first circular queue to indicate a sequential order to access a plurality of entries of the first circular queue, the plurality of entries including the first entry.

Figure 5:
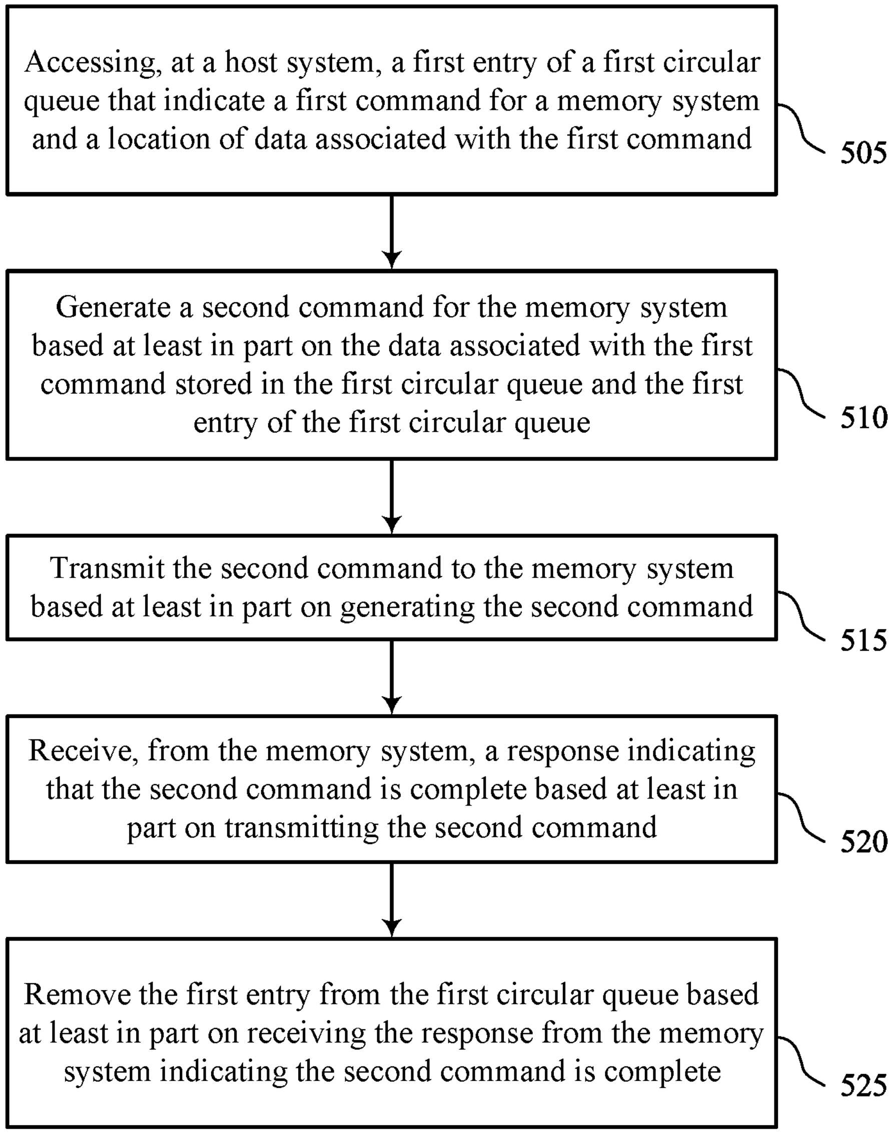
FIG. 5 shows a flowchart illustrating a method or methods that support queue configuration for host interface in accordance with examples as disclosed herein.

FIG. 5 shows a flowchart illustrating a method 500 that supports queue configuration for host interface in accordance with examples as disclosed herein. The operations of method 500 may be implemented by a host system controller or its components as described herein. For example, the operations of method 500 may be performed by a host system controller as described with reference to FIGS. 1-4. In some examples, a host system controller may execute a set of instructions to control the functional elements of the device to perform the described functions. Additionally or alternatively, the host system controller may perform aspects of the described functions using special-purpose hardware.

At 505, the method may include accessing, at a host system, a first entry of a first circular queue that indicates a first command for a memory system and a location of data associated with the first command. The operations of 505 may be performed in accordance with examples as disclosed herein. In some examples, aspects of the operations of 505 may be performed by an access component 425 as described with reference to FIG. 4.

At 510, the method may include generating a second command for the memory system based at least in part on the data associated with the first command stored in the first circular queue and the first entry of the first circular queue. The operations of 510 may be performed in accordance with examples as disclosed herein. In some examples, aspects of the operations of 510 may be performed by a generator component 430 as described with reference to FIG. 4.

At 515, the method may include transmitting the second command to the memory system based at least in part on generating the second command. The operations of 515 may be performed in accordance with examples as disclosed herein. In some examples, aspects of the operations of 515 may be performed by a transmitting component 435 as described with reference to FIG. 4.

At 520, the method may include receiving, from the memory system, a response indicating that the second command is complete based at least in part on transmitting the second command. The operations of 520 may be performed in accordance with examples as disclosed herein. In some examples, aspects of the operations of 520 may be performed by a receiving component 440 as described with reference to FIG. 4.

At 525, the method may include removing the first entry from the first circular queue based at least in part on receiving the response from the memory system indicating the second command is complete. The operations of 525 may be performed in accordance with examples as disclosed herein. In some examples, aspects of the operations of 525 may be performed by a queue component 445 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for accessing, at a host system, a first entry of a first circular queue that indicates a first command for a memory system and a location of data associated with the first command, generating a second command for the memory system based at least in part on the data associated with the first command stored in the first circular queue and the first entry of the first circular queue, transmitting the second command to the memory system based at least in part on generating the second command, receiving, from the memory system, a response indicating that the second command is complete based at least in part on transmitting the second command, and removing the first entry from the first circular queue based at least in part on receiving the response from the memory system indicating the second command is complete.

Some cases of the method 500 and the apparatus described herein may further include operations, features, circuitry, logic, means, or instructions for writing information to a second entry of a second circular queue in the host system based at least in part on receiving the response from the memory system, where removing the first entry from the first circular queue may be based at least in part on writing the second entry of the second circular queue.

In some instances of the method 500 and the apparatus described herein, the first circular queue indicates a second location to store the response from the memory system.

Some examples of the method 500 and the apparatus described herein may further include operations, features, circuitry, logic, means, or instructions for incrementing an indicator from the first entry to a second entry in the first circular queue based at least in part on receiving the response from the memory system, the indicator configured to indicate an entry in the first circular queue to be removed by the host system, where removing the first entry from the first circular queue may be based at least in part on incrementing the indicator.

In some cases of the method 500 and the apparatus described herein, accessing, at the host system, the first entry of the first circular queue to issue a third command based at least in part on the indicator incrementing from the first entry to the second entry.

Some instances of the method 500 and the apparatus described herein may further include operations, features, circuitry, logic, means, or instructions for identifying a second entry of the first circular queue to write the second command for the memory system based at least in part on an indicator associated with the first circular queue, the indicator configured to indicate an entry in the first circular queue configured to receive information from the host system and writing, at the host system, second data associated with the second command to the second entry of the first circular queue based at least in part on identifying the second entry using the indicator.

Some examples of the method 500 and the apparatus described herein may further include operations, features, circuitry, logic, means, or instructions for incrementing the indicator from the second entry to a third entry of the first circular queue to indicate the third entry may be available to write to by the host system based at least in part on writing the second data to the second entry.

Some cases of the method 500 and the apparatus described herein may further include operations, features, circuitry, logic, means, or instructions for accessing the location of the data associated with the first command, where generating the second command may be based at least in part on accessing the location of the data associated with the first command.

Some instances of the method 500 and the apparatus described herein may further include operations, features, circuitry, logic, means, or instructions for configuring the first circular queue for a first processor based at least in part on a quantity parameter associated with entries of the first circular queue and an entry size parameter, where accessing the first circular queue may be based at least in part on configuring the first circular queue.

Some examples of the method 500 and the apparatus described herein may further include operations, features, circuitry, logic, means, or instructions for determining that the first circular queue may be devoid of data based at least in part on a first indicator associated with the first circular queue pointing to a same location as a second indicator associated with the first circular queue, the first indicator configured to indicate an entry in the first circular queue may be available to write to by the host system, and the second indicator may be configured to indicate an entry in the first circular queue to be removed by the host system.

In some cases of the method 500 and the apparatus described herein, the first circular queue may be configured to store commands issued by a first processor core of the host system and a second circular queue may be configured to store commands issued by a second processor core of the host system.

In some instances of the method 500 and the apparatus described herein, the host system may be configured to store a command in the second circular queue concurrently while the host system may be configured to store the first command in the first circular queue.

In some examples of the method 500 and the apparatus described herein, the first circular queue indicates a sequential order to access a plurality of entries of the first circular queue, the plurality of entries including the first entry.

It should be noted that the methods described above describe possible implementations, and that the operations and the steps may be rearranged or otherwise modified and that other implementations are possible. Further, portions from two or more of the methods may be combined.

An apparatus is described. The apparatus may include a host system including a first circular queue having a first entry that indicates a first command for a memory system and a location of data associated with the first command and a controller coupled with the host system and configured to access the first entry of the first circular queue, generate a second command for the memory system based at least in part on the data associated with the first command stored in the first circular queue and the first entry of the first circular queue, transmit the second command to the memory system based at least in part on generating the second command, receive, from the memory system, a response that the second command is complete based at least in part on transmitting the second command, and remove the first entry from the first circular queue based at least in part on receiving the response from the memory system In some examples of the apparatus, the controller may be further configured to write information to a second entry of a second circular queue in the host system based at least in part on receiving the response from the memory system, where the controller may be configured to remove the first entry from the first circular queue based at least in part on writing the second entry of the second circular queue.

In some cases of the apparatus, the controller may be further configured to increment an indicator from the first entry to a second entry in the first circular queue based at least in part on receiving the response from the memory system, the indicator configured to indicate an entry in the first circular queue to be removed by the host system, where removing the first entry from the first circular queue may be based at least in part on incrementing the indicator.

In some instances of the apparatus, the controller may be further configured to access the first entry of the first circular queue to issue a third command based at least in part on the indicator incrementing from the first entry to the second entry.

In some examples of the apparatus, the controller may be further configured to identify a second entry of the first circular queue to write the second command for the memory system based at least in part on an indicator associated with the first circular queue, the indicator configured to indicate an entry in the first circular queue configured to receive information from the host system and write, at the host system, second data associated with the second command to the second entry of the first circular queue based at least in part on identifying the second entry using the indicator.

In some cases of the apparatus, the controller may be further configured to increment the indicator from the second entry to a third entry of the first circular queue to indicate the third entry may be available to write to by the host system based at least in part on writing the second data to the second entry.

In some instances of the apparatus, the controller may be further configured to access the location of the data associated with the first command, where the controller may be configured to generate the second command based at least in part on accessing the location of the data associated with the first command.

In some examples of the apparatus, the controller may be further configured to determine the first circular queue may be devoid of data based at least in part on a first indicator associated with the first circular queue pointing to a same location as a second indicator associated with the first circular queue, the first indicator configured to indicate an entry in the first circular queue may be available to write to by the host system, and the second indicator may be configured to indicate an entry in the first circular queue to be removed by the host system.

In some cases of the apparatus, the controller may be further configured to configure the first circular queue for a first processor based at least in part on a quantity parameter associated with entries of the first circular queue and an entry size parameter, where accessing the first circular queue may be based at least in part on configuring the first circular queue.

In some instances of the apparatus, the first circular queue may be configured to store commands issued by a first processor core of the host system and a second circular queue may be configured to store commands issued by a second processor core of the host system.

In some examples of the apparatus, the host system may be configured to store a command in the second circular queue concurrently while the host system may be configured to store the first command in the first circular queue.

In some cases of the apparatus, the first circular queue may be configured to indicate a sequential order to access a plurality of entries of the first circular queue, the plurality of entries including the first entry.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:

a host system; and a host system controller coupled with the host system, wherein the host system controller is configured to interface with a memory system comprising a memory system controller that is separate from the host system controller, and wherein the host system controller is configured to:

configure a first circular queue and a second circular queue for a first processor core and a third circular queue for a second processor core, wherein a size of respective entries of the first circular queue, the second circular queue, and the third circular queue are configured based at least in part on a largest message size capable of being communicated between the host system and the memory system, wherein the first circular queue and the second circular queue are configured to store commands for the memory system, and wherein the third circular queue is configured to receive responses from the memory system that are responsive to the commands that are stored in the first circular queue and the second circular queue;

access a first entry of the first circular queue, wherein the first entry of the first circular queue stores a first command for the memory system;

transmit, to the memory system, the first command for execution at the memory system based at least in part on accessing the first entry; and receive, from the memory system, a response that is associated with the first command, wherein the response is stored in a first entry of the third circular queue operated by the second processor core based at least in part on configuring the third circular queue to store responses to the commands stored by the first circular queue and the second circular queue.

2. The apparatus of claim 1, wherein the host system controller is further configured to:

store the response from the memory system in the first entry of the third circular queue based at least in part on a head pointer of the third circular queue indicating the first entry;

increment, after storing the response in the first entry, the head pointer from the first entry to a second entry of the third circular queue; and increment, based at least in part on processing the response, a tail pointer of the third circular queue from the first entry to a next entry, wherein the tail pointer is configured to indicate an entry in the third circular queue available to be removed.

3. The apparatus of claim 1, wherein the host system controller is further configured to:

increment a tail pointer of the first circular queue from the first entry to a second entry in the first circular queue based at least in part on receiving the response from the memory system, the tail pointer of the first circular queue configured to indicate an entry in the first circular queue to be removed by the host system.

4. The apparatus of claim 3, wherein the host system controller is further configured to:

access the first entry of the first circular queue to issue a third command based at least in part on the tail pointer of the first circular queue incrementing from the first entry to the second entry.

5. The apparatus of claim 1, wherein the host system controller is further configured to:

identify a second entry of the first circular queue to write a second command for the memory system based at least in part on a head pointer of the first circular queue, the head pointer of the first circular queue configured to indicate an entry in the first circular queue configured to receive information from the host system; and write, at the host system, second data associated with the second command to the second entry of the first circular queue based at least in part on identifying the second entry using the head pointer of the first circular queue.

6. The apparatus of claim 5, wherein the host system controller is further configured to:

increment the head pointer of the first circular queue from the second entry to a third entry of the first circular queue to indicate the third entry is available to write to by the host system based at least in part on writing the second data to the second entry.

7. The apparatus of claim 1, wherein the host system controller is further configured to:

determine the first circular queue is devoid of data based at least in part on a first indicator associated with the first circular queue pointing to a same location as a second indicator associated with the first circular queue, the first indicator configured to indicate an entry in the first circular queue is available to write to by the host system, and the second indicator is configured to indicate an entry in the first circular queue to be removed by the host system.

8. The apparatus of claim 1, wherein the host system controller is further configured to:

configure the first circular queue for the first processor core based at least in part on a quantity parameter associated with entries of the first circular queue, wherein accessing the first circular queue is based at least in part on configuring the first circular queue.

9. The apparatus of claim 1, wherein the host system is configured to store a command in the second circular queue concurrently while the host system is configured to store the first command in the first circular queue.

10. The apparatus of claim 1, wherein the first circular queue is configured to:

indicate a sequential order to access a plurality of entries of the first circular queue, the plurality of entries comprising the first entry.

11. The apparatus of claim 1, wherein one or more respective pointers of each of the first circular queue, the second circular queue, and the third circular queue are configured to wrap to a starting entry of a respective queue when the one or more respective pointers exceeds a total quantity of entries in the respective queue.

12. The apparatus of claim 1, wherein the host system controller is further configured to:

communicate one or more responses, one or more commands, or both via one or more routing lines between the first processor core and the second processor core.

13. A method, at a host system controller coupled with a host system, comprising:

configuring a first circular queue and a second circular queue for a first processor core and a third circular queue for a second processor core, wherein a size of respective entries of the first circular queue, the second circular queue, and the third circular queue are configured based at least in part on a largest message size capable of being communicated between the host system and a memory system, wherein the memory system comprises a memory system controller that is separate from the host system controller, and wherein the first circular queue and the second circular queue are configured to store commands for the memory system, and wherein the third circular queue is configured to receive responses from the memory system that are responsive to the commands that are stored in the first circular queue and the second circular queue;

accessing, at the host system, a first entry of the first circular queue, wherein the first entry of the first circular queue stores a first command for the memory system;

transmitting, to the memory system, the first command for execution at the memory system based at least in part on accessing the first entry; and receiving, from the memory system, a response that is associated with the first command, wherein the response is stored in a first entry of the third circular queue operated by the second processor core based at least in part on configuring the third circular queue to store responses to the commands stored by the first circular queue and the second circular queue.

14. The method of claim 13, further comprising:

storing the response from the memory system in the first entry of the third circular queue based at least in part on a head pointer of the third circular queue indicating the first entry;

incrementing, after storing the response in the first entry, the head pointer from the first entry to a second entry of the third circular queue; and incrementing, based at least in part on processing the response, a tail pointer of the third circular queue from the first entry to a next entry, wherein the tail pointer is configured to indicate an entry in the third circular queue available to be removed.

15. The method of claim 13, wherein the first circular queue indicates a second location to store the response from the memory system.

16. The method of claim 13, further comprising:

incrementing a tail pointer of the first circular queue from the first entry to a second entry in the first circular queue based at least in part on receiving the response from the memory system, the tail pointer of the first circular queue configured to indicate an entry in the first circular queue to be removed by the host system.

17. The method of claim 16, further comprising:

accessing, at the host system, the first entry of the first circular queue to issue a third command based at least in part on the tail pointer of the first circular queue incrementing from the first entry to the second entry.

18. The method of claim 13, further comprising:

identifying a second entry of the first circular queue to write a second command for the memory system based at least in part a head pointer of the first circular queue, the head pointer of the first circular queue configured to indicate an entry in the first circular queue configured to receive information from the host system; and writing, at the host system, second data associated with the second command to the second entry of the first circular queue based at least in part on identifying the second entry using the head pointer of the first circular queue.

19. The method of claim 18, further comprising:

incrementing the head pointer of the first circular queue from the second entry to a third entry of the first circular queue to indicate the third entry is available to write to by the host system based at least in part on writing the second data to the second entry.

20. The method of claim 13, further comprising:

configuring the first circular queue for the first processor core based at least in part on a quantity parameter associated with entries of the first circular queue, wherein accessing the first circular queue is based at least in part on configuring the first circular queue.

21. The method of claim 13, further comprising:

determining that the first circular queue is devoid of data based at least in part on a first indicator associated with the first circular queue pointing to a same location as a second indicator associated with the first circular queue, the first indicator configured to indicate an entry in the first circular queue is available to write to by the host system, and the second indicator is configured to indicate an entry in the first circular queue to be removed by the host system.

22. The method of claim 13, wherein the first circular queue indicates a sequential order to access a plurality of entries of the first circular queue, the plurality of entries comprising the first entry.

23. A non-transitory computer-readable medium storing code comprising instructions, which when executed by a processor of a host system controller of a host system, cause the host system controller to:

configure a first circular queue and a second circular queue for a first processor core and a third circular queue for a second processor core, wherein a size of respective entries of the first circular queue, the second circular queue, and the third circular queue are configured based at least in part on a largest message size capable of being communicated between the host system and a memory system, wherein the memory system comprises a memory system controller that is separate from the host system controller, and wherein the first circular queue and the second circular queue are configured to store commands for the memory system, and wherein the third circular queue is configured to receive responses from the memory system that are responsive to the commands that are stored in the first circular queue and the second circular queue;

access, at the host system, a first entry of the first circular queue, wherein the first entry of the first circular queue stores a first command for the memory system;

transmit, to the memory system, the first command for execution at the memory system based at least in part on accessing the first entry; and receive, from the memory system, a response that is associated with the first command, wherein the response is stored in a first entry of the third circular queue operated by the second processor core based at least in part on configuring the third circular queue to store responses to the commands stored by the first circular queue and the second circular queue.

24. The non-transitory computer-readable medium of claim 23, wherein the instructions, when executed by the processor of the host system controller, further cause the host system controller to:

store the response from the memory system in the first entry of the third circular queue based at least in part on a head pointer of the third circular queue indicating the first entry;

increment, after storing the response in the first entry, the head pointer from the first entry to a second entry of the third circular queue; and increment, based at least in part on processing the response, a tail pointer of the third circular queue from the first entry to a next entry, wherein the tail pointer is configured to indicate an entry in the third circular queue available to be removed.

* * * * *